March 30, 1926.
E. A. KEELER
BALANCING APPARATUS
Filed May 7, 1920
1,578,831
2 Sheets-Sheet 1
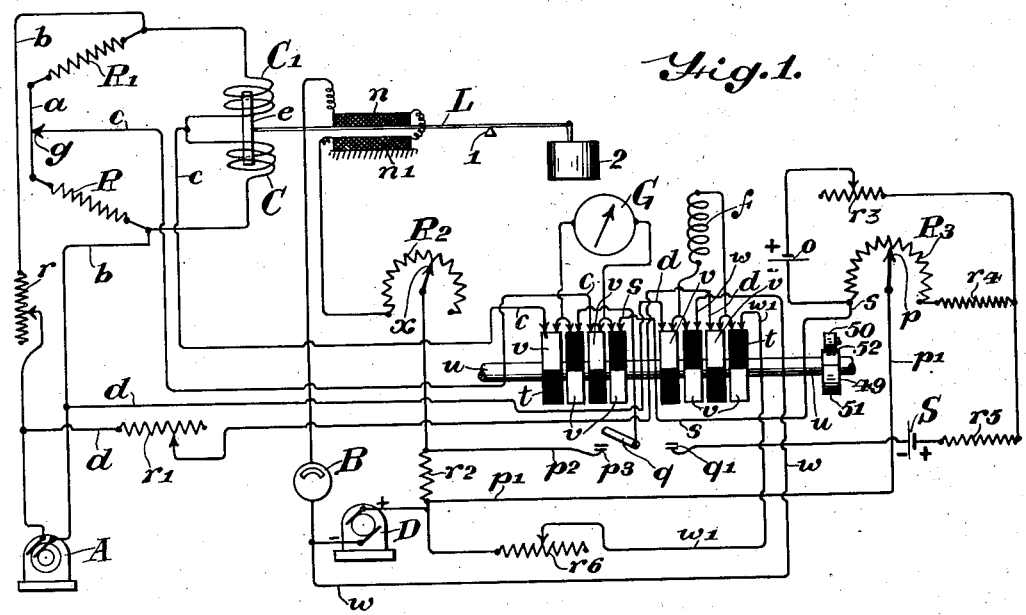
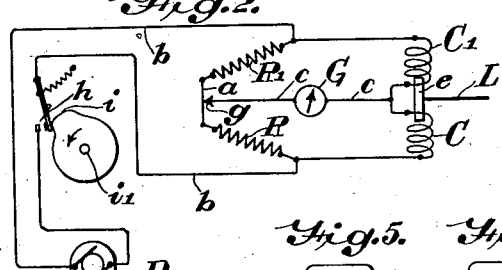
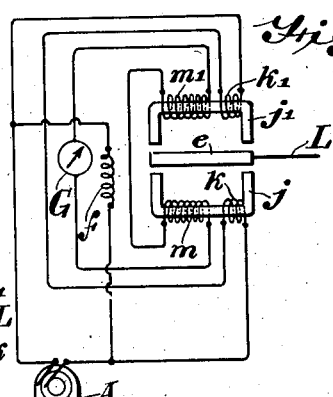
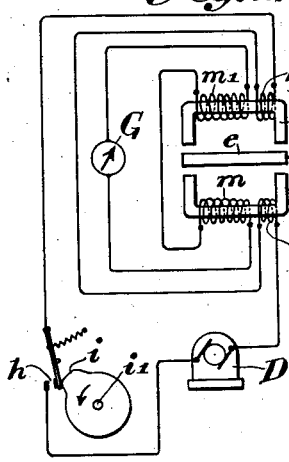
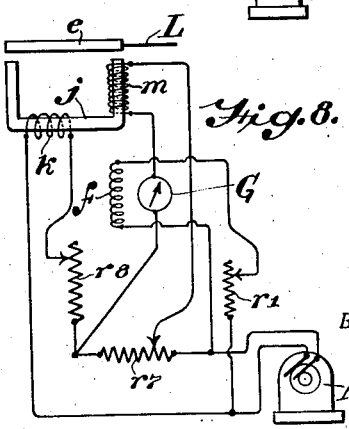
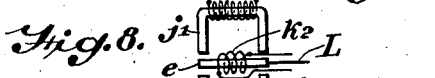
INVENTOR.
Earl A. Keeler
BY
his ATTORNEY.

March 30, 1926.
E. A. KEELER
BALANCING APPARATUS
Filed May 7, 1920
1,578,831
2 Sheets-Sheet 2
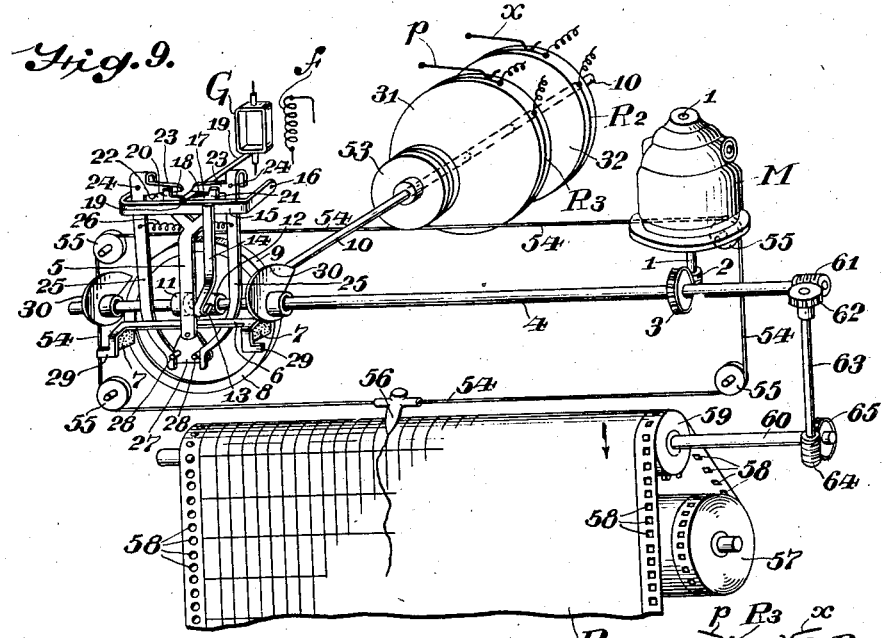
INVENTOR.
Earl A. Keeler
BY Cornelius D. Ehret
his ATTORNEY.

Patented Mar. 30, 1926.

1,578,831

UNITED STATES PATENT OFFICE.

EARL A. KEELER, OF NORRISTOWN, PENNSYLVANIA, ASSIGNOR TO LEEDS & NORTH-RUP COMPANY, OF PHILADELPHIA, PENNSYLVANIA, A CORPORATION OF PENNSYLVANIA.

BALANCING APPARATUS.

Application filed May 7, 1920. Serial No. 379,464.

*To all whom it may concern:*

Be it known that I, EARL A. KEELER, a citizen of the United States, residing in Norristown, county of Montgomery, State of Pennsylvania, have invented certain new and useful Improvements in Balancing Apparatus, of which the following is a specification.

My invention resides in electrical apparatus for controlling, as by maintaining in a state of balance, a lever, deflecting member or other mechanical element or system of elements, or equivalent.

My invention resides further in apparatus of the character referred to in which the control or balance is effected electromagnetically, and in such manner as to offer a minimum resistance to, or to produce minimum disturbing effect upon, the deflections of the lever, deflecting member or the like.

My invention resides further in apparatus of the character referred to comprising or associated with means effecting, if desired, a varying rate of motion or action of the counter-balancing mechanism; and more particularly for effecting action or motion of the counter-balancing means proportional to the degree or extent of deflection of the lever, deflecting member or the like.

My invention resides further in apparatus of the character referred to comprising a galvanometer controlling the apparatus effecting control or balancing of the lever, deflecting member or the like, said galvanometer being in turn controlled as to its deflection by electrical means responsive to changes in position of the lever, deflecting member or the like.

My invention resides also in apparatus comprising an impedance bridge, and further in such bridge in combination with the lever, deflecting member or the like.

My invention resides also in apparatus for measuring the flow of fluids, or for measuring any other suitable quantity, in terms of current employed for controlling or re-balancing the lever or deflecting member, to which is applied a force dependent upon the magnitude of flow of fluid, or upon any other magnitude, automatic means, controlled by a galvanometer, effecting the control or balance of the lever or deflecting member, and in addition effecting measuring circuit adjustment, control of a recorder or any other suitable means.

My invention resides in features of structure and combination hereinafter described and claimed.

For an illustration of some of the various forms my invention may take, reference is to be had to the accompanying drawings, in which:

Fig. 1 is a diagrammatic view of electrical features of my invention.

Fig. 2 is a fragmentary diagrammatic view illustrating a modified form of impedance bridge.

Fig. 3 is a fragmentary diagrammatic view illustrating a modification of the electrical means responsive to movement or unbalancing of the lever or deflecting member.

Fig. 4 is a modification of the arrangement indicated in Fig. 3.

Fig. 5 is a fragmentary diagrammatic view of a modified structure suitable for an impedance bridge.

Fig. 6 is a fragmentary diagrammatic view of an arrangement utilizable with apparatus involving the principle of Figs. 3 and 4.

Fig. 7 is a fragmentary diagrammatic view of a modification suitable for use with apparatus embodying the principle of Figs. 3 and 4.

Fig. 8 is a further modification of apparatus controlled in response to movement or deflection of the lever or deflecting member.

Fig. 9 is a perspective view of control apparatus utilizable in my invention.

Fig. 10 is a vertical sectional view of apparatus for controlling part of the structure of Fig. 9.

Fig. 11 is a vertical sectional view, partly in elevation, of structure utilizable in my invention.

Fig. 12 is a fragmentary sectional view illustrating a modification of apparatus shown in Fig. 11.

Referring to Fig. 1, L represents, generically, any member movable in response to any force, and particularly one varying in magnitude from time to time.

In the example illustrated, the member L is a lever movable upon the fulcrum or knife edge 1 in response to a force or variation in a force, respresented by the weight or float 2 co-acting with the lever arm to the right of the fulcrum 1.

The force applied to the member L may be representative of or caused by the flow of a fluid, change in level or head of a fluid, or a change in any condition or quantity.

The member L by its movement, as from a predetermined, neutral or balanced position, effects a control of automatic apparatus which in turn controls means for bringing the member L back to the predetermined position.

The apparatus controlled in response to movement of the member L for effecting control of the automatic mechanism may be an impedance bridge or any other suitable or equivalent apparatus.

In Fig. 1 such apparatus is an impedance bridge comprising the resistances R and $R^1$ with part of the slide wire $a$ in each of different arms of the bridge, in whose remaining arms are connected, respectively, the impedance coils C and $C^1$. In the conjugate conductor $b$ are connected the source of fluctuating or alternating current A and variable resistance $r$. In the other conjugate conductor $c$ is connected, through suitable switching mechanism later to be described, the moving coil of a galvanometer G having the field coil $f$ connected, through suitable switching mechanism hereinafter referred to, to the source A through the conductors $d$ and variable resistance $f^1$.

Co-acting with the coils C and $C^1$ is the magnetizable member or movable core $e$ carried by the member L. With the member L in any predetermined position, as in a position of balance, the contact $g$, forming one end of the conjugate conductor $c$, is moved along the slide wire $a$ to such position that the bridge is balanced, in which case no current will flow through the moving coil of the galvanometer G. If for any reason the member L moves from said predetermined position, the core $e$ will approach further toward or extend further into one of the coils C, $C^1$ and be correspondingly removed further from or project less into the other coil, with the result that one of the coils will exhibit greater impedance, and the other less impedance, than normal, thereby unbalancing the bridge and causing a current in the movable coil of the galvanometer G of a magnitude depending upon the degree of unbalancing, and of an instantaneous direction or phase relation causing deflection of the needle or pointer of the galvanometer G to a certain extent in a certain direction. With movement of the member L in opposite direction, the needle of the galvanometer G will deflect in opposite direction, and to an extent dependent upon the degree of movement of the member L.

Accordingly the member L controls the impedance bridge, which in turn effects control of the galvanometer, which latter is employed to effect control of any suitable mechanism.

As a modification of the impedance bridge, there may be employed structure of the character indicated in Fig. 2, where the bridge per se is similar to that shown in Fig. 1, but the galvanometer G in this case may be a direct current galvanometer, and there may be employed in the conjugate conductor $b$ a source of direct current D, in series with which is an interrupter mechanism $h$ periodically actuated by the cam $i$, producing a pulsatory current. The mode of action is similar, however, in that the movement of the core $e$ upon member L changes the impedance or inductance of the coils C and $C^1$, unbalancing the bridge and causing deflection of the galvanometer G in one direction or the other as the member $e$ moves in the one direction or the other, and the extent of deflection of the galvanometer being large or small, as the deflection of the member L is large or small.

In lieu of the impedance bridge there may be employed any other suitable arrangement, such, for example, as that indicated in Fig. 3, in which the magnetizable member $e$, movable with the member L, moves in the space between the core structures $j$ and $j^1$ on which are disposed, respectively, the primary coils $k$ and $k^1$ energized from the source A of fluctuating or alternating current. Upon the core structures are disposed also the secondary windings $m$ and $m^1$, connected in series with the movable coil of the alternating current galvanometer G, whose field $f$ is energized from the source A. When the member $e$ is in the neutral or predetermined position, the electro-motive-forces induced in the coils $m$ and $m^1$ are equal and opposite, and there is no deflection of the galvanometer G. When the member $e$ approaches one core structure and recedes from the other, the balance is upset, and one or the other of the secondaries $m$ or $m^1$ produces a greater electro-motive-force than the other, causing a deflection of the galvanometer G, whose extent is dependent upon the degree of deflection of the member $e$ and whose direction of deflection depends upon the direction of deflection of the member $e$.

In Fig. 4 the arrangement is similar in principle. In this case, however, the galvanometer G may be of a direct current type, the coils $k$ and $k^1$ connected in circuit with the source of direct current D and the interrupter $h$ actuated by cam $i$.

In Fig. 5 is indicated a modfication utilizable in connection with the impedance bridge, wherein the impedance coils C, $C^1$ are disposed upon a core structure having poles with respect to which the member $e$ moves, the member $e$ also approaching closely to that part of the yoke structure joining the different poles. In this case again movement of the member e changes the inductance of the coils C, C¹ and affects the bridge.

In Fig. 6 is an arrangement of the primary and secondary coils of Figs. 3 and 4 upon a specifically different type of core structure, which in this instance has a gap forming poles with respect to which the member $e$ moves, the member $e$ also closely approaching the yoke portion of the core structure.

In Fig. 7 is a further modification suitable for use in the arrangements of Figs. 3 and 4. In this case the primary coils $k$ and $k^1$ of Figs. 3 and 4 are supplanted by a single primary coil $k^2$ surrounding the movable member $e$, the secondary windings $m$ and $m^1$ being disposed as before upon core structures $j$ and $j^1$, between whose poles the member $e$ is movable.

In Fig. 8 is shown a control arrangement alternative to those above described. The member $e$ carried by the member L is movable with respect to the poles of the core structure $j$, upon which is disposed the primary winding $k$ receiving current from the alternating current generator A through the resistances $r^7$ and $r^8$, the latter variable suitably to adjust the primary current. The secondary coil $m$ is connected in series through the movable coil of the galvanometer G across a variable portion of the resistance $r^7$; while the field coil $f$ of the galvanometer is supplied by current from the source A through the adjustable resistance $r^1$. With the member L in normal or balanced position, the amount of resistance $r^7$ in circuit with the galvanometer G and secondary $m$ is adjusted to such value that there is no deflection of the movable coil of the galvanometer G; and the electro-motive-force induced in the secondary $m$ is opposed and equal to the fall of potential across that part of the resistance $r^7$ in circuit with the galvanometer G and secondary $m$ resulting from the flow of current through resistance $r^7$ to the primary coil $k$. In this arrangement there will be an attraction between the member $e$ and the poles of the core structure $j$; and this attraction is suitably balanced by suitably counter-weighting the member L, as by applying a suitable weight thereto to the right of its fulcrum, as viewed in Fig. 1.

To re-balance the member L, as by restoring it to a predetermined neutral or normal position, any suitable means may be employed. Preferably, however, electro-magnetic means are utilized to oppose the force acting upon the member L, the magnitude of current employed being then a measure of the force applied to the member L, or of the magnitude of any condition or quantity causing or allowing movement of the member L. The same current may be utilized also to control a recorder, control mechanism or any other suitable means.

Referring again to Fig. 1, there is shown attached to the member L a coil or electro-magnet $n$ co-acting with a fixed coil or magnet $n^1$ and connected in circuit with the coil $n$ and the rheostat or adjustable resistance $R^2$, resistance $r^2$, source D of direct current and ammeter B. The source D may deliver current of any suitable character, either alternating or direct; for other purposes hereinafter referred to, however, it is preferably a source of direct current. The magnitude of reaction between the magnetic fields produced by the coils $n$ and $n^1$ is graduated or adjusted by the rheostat $R^2$ to any suitable value, particularly to a value causing application to the member L of a force capable of balancing the force exerted thereon by member 2 or any other means. The ammeter B will indicate the magnitude of the current traversing the coils $n$ and $n^1$, and so serve as an indication of the magnitude of the force exerted by the member 2 or other means, and may thus serve indirectly to measure the magnitude of the condition or quantity represented by the force operating upon the member L.

The rheostat $R^2$ may be and preferably is automatically adjusted by the automatic control mechanism hereinafter described.

The current exciting the coils $n$ and $n^1$ traverses a resistance $r^2$, whereby the difference of potential across the terminals of resistance $r^2$ is representative of the magnitude of said current.

The galvanometer G of Fig. 1, in addition to co-acting with the above described impedance bridge or equivalent, is adapted to co-act also with a potentiometer comprising the battery or source of current $o$ connected in series with the variable resistance $r^3$, resistance $r^4$ and the potentiometer slide wire or resistance $R^3$, with which co-acts the movable contact $p$ connected to one terminal of the aforesaid resistance $r^2$ through the conductor $p^1$. The other terminal of the resistance $r^2$ connects by conductor $p^2$ with the terminal $p^3$ of a double throw switch $q$ adapted to be connected through switching mechanism later to be described with one terminal of the movable coil of the galvanometer G whose other terminal is simultaneously connected through said switching mechanism and conductor $s$ with the potentiometer slide wire $R^3$. When the switch $q$ is thrown into its other position in engagement with the contact $q^1$, the standard cell S with series resistance $r^5$ is associated with the galvanometer G and the potentiometer.

The switching mechanism controlling the connections of the galvanometer G may comprise a plurality of disks, as $t$, Fig. 1, secured upon and rotated by the shaft $u$ comprised in the automatic mechanism hereinafter described. One-half or other suitable fraction of the periphery of each disk $t$ may be of insulating material, and the remainder is a contact $v$. In the position of the switching mechanism indicated in Fig. 1, the movable coil of the galvanometer G is connected in the conjugate conductor $c$ of the impedance bridge, while its field coil $f$ is connected to the source A of alternating current. In the other effective position of the switching mechanism, with the switch $q$ in engagement with contact $p^3$, the movable coil of the galvanometer G will be connected in series between the conductors $p^2$ and $s$ in association with the potentiometer, while its field coil $f$ will be connected through conductors $w$ and $w^1$ and adjustable resistance $r^6$ with the terminals of the source of direct current D. In the same position of the switching mechanism, but with the switch $q$ thrown into engagement with the contact $q^1$ the field coil $f$ will, as before, be connected to the source of direct current D, but the movable coil of the galvanometer G will then be connected in series with the standard cell S, resistance $r^5$ and conductor $s$ across a part of the potentiometer resistance including its slide wire $R^3$.

For an illustration of one of the forms the automatic control mechanism may take, reference may be had to Figs. 9 and 10, in which is shown mechanism in general similar to the mechanism shown in Leeds Patent 1,125,699.

In Fig. 9, M is an electric motor, or any other suitable source of power, which continuously rotates shaft 4 through the worm gearing 3. Pivoted near its upper end is a lever 5, back of which and pivoted upon a horizontal axis on lever 5 is the arm 6, on each end of which is a shoe 7 of cork or other suitable material, frictionally engaging the rim 8 of the clutch disk or wheel 9 secured upon and driving the shaft 10. Secured upon the shaft 4 is a cam 11, which periodically engages the lever or member 5 and moves it outwardly away from the disk 9 in opposition to a spring, not shown, thereby lifting the shoes 7 free from the rim 8 of the clutch disk 9, the aforesaid spring returning the shoes 7 into engagement with the rim 8 after predetermined extent of rotation of the cam 11. Upon the shaft 4 is secured a second cam 12 which, after the cam 11 has lifted the shoes 7 from the rim 8, actuates the end of finger 13 on the lower end of the arm 14 secured at its upper end to the member 15, pivoted at its opposite ends at 16. To the frame or member 15 is secured by solder or screws not shown, the member 17, having the upper edges 18 inclined upwardly and laterally. Disposed immediately above the member 17 and adapted to be engaged by either of the inclined edges 18, 18 is the needle or pointer 19 secured to the movable coil of the galvanometer G. At opposite ends of the member 17 are the abutments 20 and 21 for limiting the lateral deflection of needle 19. Directly above the needle 19 and beneath which it normally freely swings are the edges 22, preferably straight and horizontal, upon members 23, 23, pivoted at 24, 24 and extending toward each other, leaving a gap of sufficient width between their inner ends to allow free passage of the needle 19 when in balanced, zero or mid position, the needle 19 normally swinging freely between the edges 18 of members 17 and the lower edges 22 of members 23, 23, which latter have the downwardly extending arms 25, 25, drawn towards each other by the spring 26. Carried upon the lower end of the arm or lever 5 is the triangular plate 27 carrying the pins 28, 28 co-operating with the lower ends of members 25, 25. At opposite ends of the arm 6 are the ears or lugs 29, 29 adapted to be engaged by the cams 30, 30 similar in shape and similarly positioned and secured upon the shaft 4.

Loosely carried by the shaft 10 is a disk or wheel 31 of insulating material, carrying upon its periphery the potentiometer slide wire resistance $R^3$, which may be disposed in the form of a helix engaged by the aforesaid stationary contact $p$.

Loosely carried by the shaft 10 is a second wheel or disk 32 of insulating material, carrying on its periphery the aforesaid resistance $R^2$, which may be in helical form, and engaged by the stationary contact $x$.

Referring to Fig. 10, the aforesaid disks 31 and 32 are shown as mounted upon members 33 and 34, respectively, loosely rotatable upon the aforesaid shaft 10. On their adjacent sides the members 33 and 34 are provided with a circular series of notches 35 and 36, with which co-acts the dog 37 pivoted at 38 upon the collar 39 secured by screw 40 to the shaft 10, the lower end of the dog 37 extending through an aperture in the shaft 10 into the bore 41. The outer end of the dog 37 is biased toward position to engage in a slot 35 of member 33 by any suitable means, as for example, a spring 41$^a$ disposed in the bore 41 between the left end of said bore and the lower end of dog 37. Disposed in the bore 41 and engaging at its one end in a notch in the lower end of the dog 37 is the rod 42 engaging with its other end the cupped screw 43 carried at the upper end of the arm 44 of a bell crank lever whose other arm is 45. The bell crank is pivoted at 46 to the lower end of the downwardly extending stationary member 47, to which is secured the spring 48 tending to thrust the screw 43 and member 42 toward the left in opposition to spring 41$^a$.

The aforesaid shaft $u$, carrying the switch disks $t$, has secured thereto the cam 49, with which engages the cam follower or roller 50 carried by the arm 45 of the aforesaid bell crank. The cam 49 for substantially one-half, or any other suitable fraction of its periphery, has a uniformly large diameter indicated at 51, and for the remainder of its periphery has a lesser diameter, indicated at 52, the relations of the peripheral extents of the parts 51 and 52 corresponding substantially with the peripheral extents of the conducting and insulating portions of the switch disks $t$.

The shaft $u$ is driven by the motor M, shaft 4 or any other continuously rotating part of the above described mechanism, through any suitable gearing, not shown, at desired or required speed. For example, the shaft $u$ may make one complete revolution per minute.

Referring again to Fig. 9, there is secured to or movable with disk 31 a grooved pulley or wheel 53 around which passes the cord 54 passing over the idler rollers or wheels 55 and secured to the marker or recorder pen 56 movable transversely, on guides, not shown, with respect to the recorder paper P stored upon a roller or spool 57 and having the marginal perforations 58, in which engage teeth or pins upon the periphery of the roller 59 secured upon the shaft 60 driven by shaft 4 through worm 61, gear 62, shaft 63, worm 64 and gear 65.

The operation is as follows:

With the switch disks $t$ in the position indicated in Fig. 1, the moving coil of the galvanometer G is in circuit with the impedance bridge and its field $f$ excited by alternating current. The corresponding position of the cam 49 is that indicated in Fig. 10, causing the dog 37 to engage in a slot 36 on member 34, thereby locking the disk 32 to the shaft 10, the disk 31 in the meantime being free of the shaft 10 and remaining in position to which last rotated thereby.

If now the member L is deflected from its normal or balanced position, the impedance bridge or equivalent will be unbalanced, causing deflection of the needle 19 of the galvanometer G toward the right or the left, Fig. 9, depending upon the direction of movement of the member L, and the extent of deflection of needle 19, in turn depending upon the extent of movement of the member L.

Assuming the needle 19 to have deflected toward the right, Fig. 9, it will be clamped, due to upward movement of the member 15 by cam 12, between the right hand inclined edge 18 of member 17 and the lower edge 22 of the right hand member 23, causing the right hand arm 25 to be tilted on its pivot 24 in a clockwise direction, thereby pushing on the right hand pin 28 on the plate 27 to tilt the movable or driving clutch member or arm 6 in a clockwise direction, while cam 11 is holding shoes 7, 7 disengaged from the rim 8 of the clutch wheel 9. The extent of the angular adjustment of the member 6 is dependent, because of inclination of edge 18, upon the degree of deflection of the needle 19, and therefore upon the extent of movement of the member L. The cam 11 soon allows, because of further movement of the continuously rotating shaft 4, the shoes 7, 7 again to grip the rim 8 of disk 9, and thereafter the left hand cam 30 engages the left ear 29, which has been elevated by the angular adjustment of the member 6, pushing downwardly upon the ear 29, due to continued rotation of the cam 30 by shaft 4, restoring the arm 6 to horizontal position indicated; but in so moving back to normal position the member 6 carries with it the clutch disk 9 in a counterclockwise direction, thereby rotating the shaft 10, and the disk 32 carrying the resistance $R^2$. This movement of the resistance $R^2$ changes the value of the current flowing through the rebalancing coils $n$ and $n^1$ in such wise that the member L is returned to or toward the normal or balanced position. If this single automatic adjustment of the resistance $R^2$ effects a re-balance or restoration of the member L to normal position, the member $e$ will have been restored to normal position, for which the impedance bridge is balanced and the galvanometer needle 19 has returned to normal position of zero deflection. If, however, the re-balance has been only partially effected, the galvanometer needle 19 will continue to deflect toward the right, but to lesser extent, because the impedance bridge is less out of balance because of return of the member $e$ toward normal or balanced position. The needle 19 will, however, during the next cycle of operation of the mechanism described, be again clamped between the edges 18 and 22, again angularly adjusting the member 6, but to lesser degree because of the now lesser deflection of needle 19, and as a result the disk 32 will again be rotated in the same direction as before, but by lesser increment, and this will again effect a further adjustment of the current through the coils $n$ and $n^1$, returning the member L farther toward normal or balanced position. And so on, there may be any number of movements of the disk 32 until a re-balance is effected, the rotation of the shaft $u$ being at least slow enough to allow ample time for re-balancing.

Similarly, if the member L moves in opposite direction to that above assumed, the needle 19 will deflect toward the left, with action similar to that above described, except that the direction of rotation of the resistance $R^2$ with respect to its contact $x$ will be opposite to that above assumed.

Upon continued rotation of the shaft 4 and the co-acting parts, the shaft $u$ carrying the switch disks $t$ and the cam 49 will have rotated to such position that the cam follower 50 will have left cam surface 52 and ride upon cam surface 51, thereby rotating the bell crank lever 44, 45, Fig. 10, in clockwise direction upon its pivot 46, withdrawing screw 43 toward the right in opposition to spring 48, the spring $41^a$ thrusting the lower end of dog 37 toward the right and the upper end of the dog toward the left into engagement with a notch 35 in the member 33. Disk 32 is now free from shaft 10, and disk 31 is locked thereto by dog 37. The switch disks $t$ are now in the position the reverse of that indicated in Fig. 1, whereby the movable coil of the galvanometer G is connected through switch $q$ in series with conductors $p^2$ and $s$; and simultaneously, its field coil $f$ is connected through conductors $w$ and $w^1$ through the resistance $r^6$ with the source of direct current D, which latter, however, is continuing to deliver the same magnitude of current as before through the resistance $r^2$ and coils $n$ and $n^1$ holding or tending to hold the member L in or toward balanced position, the ammeter or other instrument B serving by its indications to give the current strength or any other reading dependent upon such current strength.

If now the fall of potential across the resistance $r^2$ due to the aforesaid current through the balancing coils $n$, $n^1$, is equal to the fall of potential through the resistance $R^3$ between the contact $p$ and the point of connection to the resistance $R^3$ of the conductor $s$, the galvanometer will not deflect, and the marker 56 of the recorder will not be moved either toward the right or the left, but will continue to make a mark upon the paper P at such position transversely thereof as corresponds with the strength of current through resistance $r^2$ and coils $n$, $n^1$.

If, however, the fall of potential between the terminals of the resistance $r^2$ does not equal the fall of potential in the left hand portion of the resistance $R^3$, the galvanometer will deflect in such direction as to cause, by the mode of operation above described, rotation of the disk 31 in such direction as to so change the position of the contact $p$ with respect to the resistance $R^3$ as to effect a fall of potential in the portion of the resistance $R^3$ to the left of the contact $p$, Fig. 1, equal to or approaching equality with the difference of potential between the terminals of the resistance $r^2$, the apparatus continuing automatically to move the disk 31 and resistance $R^3$ until equality is reached. Since pulley 53 moves with disk 31, the marker 56 in the meantime traverses the paper P to an extent proportional to the movement of the contact $p$ with respect to resistance $R^3$. Or if the deflection of the galvanometer is in direction opposite to that above assumed, the resistance $R^3$ will be moved in opposite direction until a balance is obtained, the marker 56 in such case also moving in opposite direction to that above assumed.

Accordingly the mechanism described operates automatically alternately as a controller to effect adjustment of the strength of current through the coils $n$, $n^1$, and to make a record dependent upon or representative of that strength of current.

From the operation of the automatic mechanism as above described it is apparent, since the magnitude of the galvanometer deflection is dependent upon the magnitude of deflection of the member L, that the rate of change of the re-balancing force exerted upon the member L, as by coils $n$, $n^1$, or equivalent, is proportional to the amount the member L has departed from predetermined, normal or balanced position. That is, the greater the unbalance or departure of the member L, the greater is the rate of change of the re-balancing force applied to the member L.

The calibration of the recording mechanism depends upon the strength of current delivered by the battery $o$ through the potentiometer resistances; it accordingly is desirable, from time to time, because of change in the current delivered by battery $o$, which may be an ordinary primary battery or storage battery, to return the current strength to the necessary or predetermined value. To this end the switch $q$ may be withdrawn from contact $p^3$, in which position it has been above assumed, into engagement with contact $q^1$, whereby the movable coil of the galvanometer G, with the switch disks $t$ in the position last above assumed, is brought into circuit with the standard cell S and resistance $r^5$, the latter serving to prevent too great a current flow from cell S. The resistance $r^3$ may then be adjusted to cause zero deflection of the movable coil of the galvanometer G, in which case the correct current strength will be flowing from battery $o$ through the potentiometer circuit.

In case the arrangement of either Fig. 2 or Fig. 4 is employed in lieu of the impedance bridge shown in Fig. 1, the cam $i$ is rotated at uniform speed suitably proportioned to the speed of the shaft 4, the cam $i$ being so positioned on its driving shaft $i^1$ that the current controlled by the interrupter $h$ is either established or broken just before the galvanometer needle 19 is clamped by the above described mechanism.

As an example of a mode of use of the apparatus hereinbefore described involving a member such as L, and as involving a feature of my invention, reference may be had to the measurement and recording of the flow of a fluid.

Referring to Fig. 11, there is illustrated mechanism, some of which, per se, is not my invention, but which, or an equivalent thereof, in the combination described, is comprehended by my invention.

In Fig. 11, E is a pipe or conduit with which is associated any suitable means for producing a differential pressure varying with the rate of flow of the fluid. In the example illustrated, there is employed a plate $y$ having the orifice $z$. With the interior of the pipe on opposite sides of the orifice plate communicate the pipes 66 and 67 communicating, respectively, with the chambers 68 and 69 formed within the casing structure 70. The chambers 68 and 69 are divided from each other by the flexible diaphragm 71, to which is connected the vertical lever 72 having a knife edge bearing at 73 and controlled by spring 74 adjustable by screw 75. Within the chamber 68 upon knife edges 76 is pivoted the vertical lever or member L, corresponding with the member L hereinbefore referred to. On its threaded upper end is adjustable the counter-weight 77. Adjacent its lower end it carries the re-balancing coil $n$ connected in series with the co-acting coils $n^1$ and $n^2$, these latter coils preferably being disposed outside of the casing 70, which may be of non-magnetic material. These three coils co-act substantially in the manner described in connection with Fig. 1, whereby current passed through them causes such reaction between the coils as to control the position of the lever L. At its lower end the chamber 70 has the lateral extension chambers 78 and 79, within which is disposed the member $e$ of magnetizable material. Disposed outside of the chamber 70 and surrounding the aforesaid lateral chambers 78 and 79 are the impedance coils C and $C^1$ of the character indicated in Figs. 1 and 2 connected in different arms of the impedance bridge. The lateral chamber forming members 78a and 79a are preferably of insulating material, and are held in position by the nut members 80 and 81 threaded into the casing 70.

Connected at its one end to the lever 72 is the metal wire or ribbon 82 secured at its other end in the threaded member 83 extending through the small bracket 84 on lever L, a nut 85 threaded on member 83 serving to place the member 82 under suitable tension.

With the coils C and $C^1$ of Fig. 11 suitably connected in an impedance bridge or equivalent, and the coils $n$, $n^1$ and $n^2$ connected in circuit as indicated at $n$ and $n^1$ in Fig. 1, the apparatus will operate as follows:

With the liquid flowing from left toward the right through the orifice $z$, there will exist on opposite sides of the orifice different pressures, which are communicated by the pipes 66 and 67 to the chambers 68 and 69. The higher pressure is exerted in chamber 68, and the difference in pressure on opposite sides of the diaphragm 71 causes a force to be exerted upon the lever 72 which through the wire or ribbon 82 communicates a force to the lever L, such force being dependent upon the rate of flow of fluid through the orifice $z$. The galvanometer G of Fig. 1 will be controlled by the circuits with which the coils C and $C^1$ of Fig. 11 are associated. The automatic apparatus of Figs. 1, 9 and 10 will control the current through the coils $n$, $n^1$ and $n^2$ to effect re-balancing, and the automatic recorder mechanism will produce a record showing variations in rate of flow of the fluid through the orifice $z$.

In Fig. 12 is shown a modification of the structure of Fig. 11 in that in lieu of impedance coils C and $C^1$ there are employed contacts 86 and 87 extending through the wall of the casing 70 and insulated therefrom, the member $e^1$ on the end of the lever L being adapted to engage either contact to close a control circuit, such, for example, as may be employed to effect control of the galvanometer G of the automatic mechanism.

By employing a sensitive galvanometer in the arrangements hereinbefore described, it is possible in the impedance bridge and equivalent circuit arrangements to employ current or currents of such small magnitude that the force exerted thereby upon the member $e$ will be of so low an order of magnitude as to cause substantially no effect upon the member L and so introduce substantially no error. For example, for a position of balance of the member L the coils C, $C^1$ or the primary coils $k$, $k^1$ may be so proportioned, wound and connected that their net effect upon the co-acting member $e$ is substantially nil.

It will be understood that in lieu of adjustable resistance for varying or adjusting the magnitude of alternating or fluctuating current, any other suitable means may be employed for adjusting or varying the strength of the alternating, pulsating or fluctuating current.

What I claim is:

1. The combination with a member movable from its normal position in response to a quantity to be measured, of an inductive winding and a magnetizable member movable relatively to each other, one of them movable with said movable member, a deflecting member, means causing deflection thereof in response to change of inductance of said winding, and means for returning said movable member toward normal position controlled by said deflecting member.

2. The combination with a member movable from its normal position in response to a quantity to be measured, of an inductive winding and a magnetizable member movable relatively to each other, one of them movable with said movable member, a deflecting member, means causing deflection thereof in response to change of inductance of said winding, a movable structure, a source of power, a disengageable connection between said movable structure and said source of power, means controlled by said deflecting member and controlling said disengageable connection, and means for returning said movable member toward normal position controlled by said movable structure.

3. The combination with a member movable in response to a force representative of a quantity to be measured, of an impedance bridge having windings connected in different bridge arms, a magnetizable member movable with said movable member co-acting with said windings, a galvanometer controlled by said bridge, and means controlled by said galvanometer for exerting on said movable member an opposing force.

4. The combination with a member movable in response to a force representative of a quantity to be measured, of an impedance bridge having windings connected in different bridge arms, a magnetizable member movable with said movable member co-acting with said windings, a galvanometer controlled by said bridge, and electromagnetic means comprising a fixed element and an element movable with said movable member for exerting thereon an opposing force, said electro-magnetic means controlled by said galvanometer.

5. The combination with a member movable in response to a force representative of a quantity to be measured, of an impedance bridge having windings connected in different bridge arms, a magnetizable member movable with said movable member and co-acting with said windings, a galvanometer controlled by said bridge, and electromagnetic means comprising a fixed element and an element movable with said movable member for exerting thereon an opposing force, and means controlled by said galvanometer for varying the strength of the current energizing said electro-magnetic means.

6. The combination with a member movable in response to a force representative of a quantity to be measured, of an impedance bridge having windings connected in different bridge arms, a magnetizable member movable with said movable member and co-acting with said windings, a galvanometer controlled by said bridge, and electromagnetic means comprising a fixed element and an element movable with said movable member for exerting thereon an opposing force, means for varying the strength of current for energizing said electro-magnetic means, a movable structure for actuating said current varying means, a source of power, a disengageable connection between said source of power and said movable structure, and means controlled by said galvanometer and controlling said disengageable connection.

7. The combination with a member movable in response to a force representative of a quantity to be measured, of an impedance bridge having windings connected in different bridge arms, a magnetizable member movable with said movable member and co-acting with said windings, a galvanometer controlled by said bridge, and electro-magnetic means comprising a fixed element and an element movable with said movable member for exerting thereon an opposing force, means for varying the strength of current for energizing said electro-magnetic means, a movable structure for actuating said current varying means, a source of power, a disengageable connection between said source of power and said movable structure, means controlled by said galvanometer and controlling said disengageable connection, a disengageable connection between said current varying means and said movable structure, and means controlling the same actuated by said source of power.

8. The combination with a member movable in response to a force varying in accordance with variations of a quantity, of a galvanometer, electrical means controlling said galvanometer and comprising relatively movable non-contacting members one of which is movable with said movable member, electro-magnetic means for exerting on said movable member an opposing force, means for varying the current energizing said electro-magnetic means, a source of power, a disengageable connection between said source of power and said current varying means, and means controlled by said galvanometer and controlling said disengageable connection.

9. The combination with a member movable in response to a force varying in accordance with variations of a quantity, of a galvanometer, electrical means controlling said galvanometer and comprising relatively movable members one of them movable with said movable member, electro-magnetic means for exerting on said movable member an opposing force, means for varying the current energizing said electro-magnetic means, switching mechanism for disssociating said galvanometer from said electrical means and for associating it with the circuit of said electro-magnetic means, a source of power, a movable structure, a disengageable connection between said movable structure and said source of power, means controlled by said galvanometer and controlling said disengageable connection, said current varying means actuated by said movable structure when said galvanometer is associated with said electrical means, variable electrical means actuated by said movable structure when said galvanometer is associated with said electro-magnetic means, and a marker actuated by said movable structure.

10. The combination with a member movable in response to a force varying in accordance with variations of a quantity, of a galvanometer, electrical means controlling said galvanometer and comprising relatively movable members one of them movable with said movable member, electro-magnetic means for exerting on said movable member an opposing force, means for varying the current energizing said electro-magnetic means, switching mechanism for dissociating said galvanometer from said electrical means and for associating it with the circuit of said electro-magnetic means, a source of power, a movable structure, a disengageable connection between said movable structure and said source of power, means controlled by said galvanometer and controlling said disengageable connection, said current varying means actuated by said movable structure when said galvanometer is associated with said electrical means, variable electrical means actuated by said movable structure when said galvanometer is associated with said electro-magnetic means, and disengageable mechanical connections between said movable structure and said current varying means and said variable electrical means actuated in unison with said switching mechanism.

11. The combination with a member movable in response to a force varying in accordance with variations of a quantity, of a galvanometer, electrical means controlling said galvanometer and comprising relatively movable members one of them movable with said movable member, electro-magnetic means for exerting on said movable member an opposing force, means for varying the current energizing said electro-magnetic means, switching mechanism for dissociating said galvanometer from said electrical means and for associating it with the circuit of said electro-magnetic means, a source of power, a movable structure, a disengageable connection between said movable structure and said source of power, means controlled by said galvanometer and controlling said disengageable connection, said current varying means actuated by said movable structure when said galvanometer is associated with said electrical means, variable electrical means actuated by said movable structure when said galvanometer is associated with said electro-magnetic means, and disengageable mechanical connections between said movable structure and said current varying means and said variable electrical means actuated by said source of power in unison with said switching mechanism.

12. Apparatus for measuring the flow of a fluid comprising means producing a differential pressure dependent upon the magnitude of flow, a movable member controlled by said differential pressure, electrical means controlled by said movable member, a galvanometer controlled by said electrical means, a source of power, a movable structure, a disengageable connection between said source of power and said movable structure, means controlled by said galvanometer and controlling said disengageable connection, electro-magnetic means for balancing said movable member against said differential pressure, and means for varying the current energizing said electro-magnetic means, said current varying means actuated by said movable structure.

13. Apparatus for measuring the flow of a fluid comprising means producing a differential pressure dependent upon the magnitude of flow, a movable member controlled by said differential pressure, electrical means controlled by said movable member, a galvanometer controlled by said electrical means, a source of power, a movable structure, a disengageable connection between said source of power and said movable structure, means controlled by said galvanometer and controlling said disengageable connection, electro-magnetic means for balancing said movable member against said differential pressure, means for varying the current energizing said electro-magnetic means, said current varying means actuated by said movable structure, and a marker actuated by said movable structure.

14. Apparatus for measuring the flow of a fluid comprising means producing a differential pressure dependent upon the magnitude of flow, a movable member controlled by said differential pressure, electrical means controlled by said movable member, a galvanometer controlled by said electrical means, a source of power, a movable structure, a disengageable connection between said source of power and said movable structure, means controlled by said galvanometer and controlling said disengageable connection, electro-magnetic means for balancing said movable member against said differential pressure, means for varying the current energizing said electro-magnetic means, said current varying means actuated by said movable structure, a circuit influenced by the strength of current energizing said electro-magnetic means, switching mechanism for connecting said galvanometer with said circuit, variable electrical means in said circuit actuated by said movable structure, and a marker actuated by said movable structure.

15. Apparatus for measuring the flow of a fluid comprising means producing a differential pressure dependent upon the magnitude of flow, a movable member controlled by said differential pressure, electro-magnetic means for re-balancing said member, a galvanometer controlled by the magnitude of current energizing said electro-magnetic means, a source of power, a movable structure, a disengageable mechanical connection between said source of power and said movable structure, means controlled by said galvanometer and controlling said disengageable connection, and a marker actuated by said movable structure.

16. Apparatus for measuring the flow of a fluid comprising means producing a differential pressure dependent upon the magnitude of flow, a movable member controlled by said differential pressure, electro-magnetic means for re-balancing said member, a galvanometer controlled by the magnitude of current energizing said electro-magnetic means, a source of power, a movable structure, a disengageable mechanical connection between said source of power and said movable structure, means controlled by said galvanometer and controlling said disengageable connection, variable electrical means actuated by said movable structure tending to re-balance said galvanometer, and a marker actuated by said movable structure.

17. The combination with a member movable in response to a force representative of a quantity to be measured, of variable electrical means controlled by said member, a galvanometer controlled by said means, electro-magnetic means for balancing said movable member, a recorder controlled by the current energizing said electro-magnetic means, and means controlled by said galvanometer and in turn controlling variation of said current.

18. The combination with a member movable in response to a force representative of a quantity to be measured, of electro-magnetic means for re-balancing said member, electrical means varied by said movable member, a galvanometer, means for associating said galvanometer alternately with said electrical means and the circuit of said electro-magnetic means, and automatic mechanism controlled by said galvanometer for alternately varying the strength of the current energizing said electro-magnetic means and for making a record dependent upon the strength of said current.

19. The combination with a member movable from its normal position in response to changes in magnitude of a quantity, of a circuit, means controlled by said member for varying the current in said circuit, a second member, means for moving said second member in response to changes of said current, and means for returning said first named movable member toward normal position controlled by said second movable member.

20. The combination with a member movable from its normal position in response to changes in magnitude of a quantity, of variable electrical means controlled by said member, a galvanometer responsive to changes effected by said variable electrical means, and means for returning said movable member toward normal position controlled by said galvanometer.

21. The combination with a member movable in response to changes in magnitude of a quantity, of a circuit, means controlled by said member for varying the current in said circuit, a second member, means for moving said second member in response to changes of said current, means for exerting on said first movable member a force opposing that causing its movement, and a circuit controlling said last named means controlled by said second movable member.

22. The combination with a member movable in response to changes in magnitude of a quantity, of variable electrical means controlled by said member, a galvanometer responsive to changes effected by said variable electrical means, a circuit controlled by said galvanometer, and means controlled by said circuit and exerting on said movable member a force opposing that causing its movement.

23. The combination with a member movable in response to changes in magnitude of a quantity, of a circuit, a galvanometer controlled by said circuit and having a deflecting member, means controlled by said first named member for varying the current in said circuit, a movable structure, a source of power, a disengageable mechanical connection between said source of power and said movable structure, means whereby said mechanical connection is controlled by said deflecting member, and means controlled by said movable structure and controlling exertion on said first named movable member of a force opposing that causing its movement.

24. The combination with a member movable in response to changes in magnitude of a quantity, of a galvanometer having a deflecting member, a circuit controlling said galvanometer, a source of fluctuating current in said circuit, a reactance in said circuit controlled by said movable member, a movable structure, a source of power, a disengageable connection between said source of power and said movable structure, means whereby said connection is controlled by said deflecting member, and means controlled by said movable structure and controlling exertion on said first named movable member of a force opposing that causing its movement.

25. The combination with a member movable in response to changes in rate of fluid flow, of a circuit, a galvanometer controlled by said circuit and having a deflecting member, means controlled by said first named member for varying the current in said circuit in response to changes in said rate of fluid flow, a movable structure, a source of power, a disengageable mechanical connection between said source of power and said movable structure, means whereby said mechanical connection is controlled by said deflecting member, and means controlled by said movable structure and controlling exertion on said first-named movable member of a force opposing that causing its movement.

26. The combination with a member movable from its normal position, of means moving said member to different extents in response to different magnitudes of a quantity, a movable structure, a source of power, a mechanical coupling between said source of power and said movable structure, means whereby said movable member controls said coupling to effect movements of said movable structure, means causing the extents of said movements of said movable structure to correspond with the extents of movement of said movable member, means for restoring said movable member toward normal position controlled by said movable structure, and means whereby said restoring means operates at a rate depending upon extent of movement of said movable structure.

27. The combination with a member movable from its normal position, of means moving said member to different extents in response to different magnitudes of a quntity, a movable structure, a source of power, means controlled by said movable member for effecting movement of said movable structure by said source of power, means causing the extents of movement of said movable structure to correspond with the extents of movement of said movable member, means for restoring said movable member toward normal position controlled by said movable structure, and means whereby said restoring means operates at a rate depending upon extent of movement of said movable structure.

28. The combination with a member movable in response to changes in magnitude of a quantity, of variable electrical means controlled thereby, a galvanometer controlled by said electrical means, a movable structure, means controlled by said galvanometer causing movement of said structure an extent dependent upon the extent of deflection of said galvanometer, and means controlled by said movable structure controlling exertion on said movable member of a force opposing that causing its movement.

29. The combination with a member movable from its normal position in response to changes in magnitude of a quantity, of variable electrical means controlled thereby, a galvanometer controlled by said electrical means, a movable structure, means controlled by said galvanometer causing movement of said structure an extent dependent upon the extent of deflection of said galvanometer, and electro-magnetic means controlled by said movable structure for restoring said movable member toward normal position.

30. The combination with a member movable from its normal position in response to changes in magnitude of a quantity, of variable electrical means controlled thereby, a galvanometer controlled by said electrical means, a movable structure, means controlled by said galvanometer causing movement of said structure an extent dependent upon the extent of deflection of said galvanometer, means for restoring said movable member toward normal position controlled by said movable structure, and means controlling said last named means to effect said return movement of said movable member at a rate depending upon extent of movement of said movable structure.

31. The combination with a member movable from its normal position in response to changes in magnitude of a quantity, of variable electrical means controlled thereby, a galvanometer controlled by said electrical means, a movable structure, means controlled by said galvanometer causing movement of said structure an extent dependent upon the extent of deflection of said galvanometer, electro-magnetic means controlled by said movable structure for restoring said movable member toward normal position, and means controlling said electro-magnetic means to effect said return movement of said movable member at a rate dependent upon the extent of movement of said movable member.

32. The combination with a member movable in response to changes in rate of fluid flow, of a galvanometer having a deflecting member, a circuit controlling said galvanometer, a source of fluctuating current in said circuit, a reactance in said circuit controlled by said movable member to cause deflection of said deflecting member in accord with changes in rate of fluid flow, a movable structure, a source of power, a disengageable connection between said source of power and said movable structure, means whereby said connection is controlled by said deflecting member, and means controlled by said movable structure and controlling exertion on said first named movable member of a force opposing that causing its movement.

33. The combination with a member movable from its normal position in response to changes in magnitude of a quantity, of a plurality of windings and a source of fluctuating current therefor, a galvanometer in circuit therewith, a member movable by said movable member for changing the effect of said windings upon said galvanometer, and means controlled by said galvanometer for exerting on said movable member a force for restoring it toward normal position.

34. The combination with a member movable from its normal position in response to changes in magnitude of a quantity, of a plurality of windings and a source of fluctuating current therefor, a galvanometer controlled by the current in said windings, a member movable by said movable member for changing the effect of said windings upon said galvanometer, means controlled by said galvanometer for exerting on said movable member a force for restoring it toward normal position, a second circuit, means for affecting the current in said second circuit to an extent corresponding with the magnitude of said force, and means controlled by the current in said second circuit for producing a record of said changes in magnitude of said quantity.

35. The combination with a member movable from its normal position in response to changes in magnitude of a quantity, of a plurality of windings and a source of fluctuating current therefor, a galvanometer controlled by the current in said windings, a member movable by said movable member for changing the effect of said windings upon said galvanometer, means controlled by said galvanometer for exerting on said movable member a force for restoring it toward normal position, a second circuit, means for affecting the current in said second circuit to an extent corresponding with the magnitude of said force, means for shifting the connections of said galvanometer to bring it into the influence of said circuit, and means controlled by said galvanometer for recording said changes in magnitude of said quantity.

36. The combination with a member movable from its normal position in response to changes in magnitude of a quantity, of variable electrical means controlled by said member, a galvanometer controlled by said electrical means, means controlled by said galvanometer for exerting on said movable member a force for restoring it toward normal position, a circuit, means affecting the current in said circuit to an extent corresponding with the magnitude of said force, and a movable structure controlled by said circuit.

37. The combination with a member movable from its normal position in response to changes in magnitude of a quantity, of variable electrical means controlled by said member, a galvanometer controlled by said electrical means, means controlled by said galvanometer for exerting on said movable member a force for restoring it toward normal position, a circuit, means affecting the current in said circuit to an extent corresponding with the magnitude of said force, means for shifting the connections of said galvanometer to bring it into the influence of said circuit, and a movable structure controlled by said galvanometer.

38. The combination with a member movable from its normal position in response to changes in magnitude of a quantity, of variable electrical means controlled by said member, a galvanometer controlled by said electrical means, means controlled by said galvanometer for exerting on said movable member a force for restoring it toward normal position, a circuit, means affecting the current in said circuit to an extent corresponding with the magnitude of said force, means for shifting the connections of said galvanometer to bring it into the influence of said circuit, a movable control structure, a source of power, a disengageable connection between said source of power and said movable structure, and means controlled by said galvanometer and controlling said disengageable connection.

39. The combination with a member movable from its normal position in response to changes in magnitude of a quantity, of variable electrical means controlled by said member, a galvanometer controlled by said electrical means, means controlled by said galvanometer for exerting on said movable member a force for restoring it toward normal position, a circuit, means affecting the current in said circuit to an extent corresponding with the magnitude of said force, means for shifting the connections of said galvanometer to bring it into the influence of said circuit, a movable structure, a source of power, a disengageable connection between said source of power and said movable structure, means controlled by said galvanometer and controlling said disengageable connection, and a marker controlled by said movable structure.

40. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electrical means for restoring said movable member toward normal position, means for varying the current of said electrical means, and a disengageable connection between said current-varying means and said movable structure.

41. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electrical means for restoring said movable member toward normal position, means for varying the current of said electrical means, and means periodically coupling said current-varying means to said movable structure.

42. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electro-magnetic means for restoring said movable member toward normal position, a circuit, variable electrical means in said circuit, means for shifting the connections of said galvanometer to bring it into the influence of said circuit and of the current of said electro-magnetic means, and a disengageable connection between said movable structure and said variable electrical means.

43. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electro-magnetic means for restoring said movable member toward normal position, a circuit, variable electrical means in said circuit, means for shifting the connections of said galvanometer to bring it into the influence of said circuit and of the current of said electro-magnetic means, and means for periodically coupling said variable electrical means to said movable structure.

44. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electro-magnetic means for restoring said movable member toward normal position, a circuit, variable electrical means in said circuit, means for shifting the connections of said galvanometer to bring it into the influence of said circuit and of the current of said electro-magnetic means, a disengageable connection between said movable structure and said variable electrical means, and a marker movable in unison with said variable electrical means.

45. The combination with a member movable from its normal position in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, electro-magnetic means for restoring said movable member toward normal position, a circuit, variable electrical means in said circuit, means for shifting the connections of said galvanometer to bring it into the influence of said circuit and of the current of said electro-magnetic means, means for periodically coupling said variable electrical means to said movable structure, and a marker movable in unison with said variable electrical means.

46. The combination with a member movable in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, a source of current, means responsive to changes in said current for exerting a force upon said movable member, means for varying said current, a disengageable connection between said current-varying means and said movable structure, a circuit, variable electrical means therein, a disengageable connection between said variable electrical means and said movable structure, and means for shifting the connections of said galvanometer to bring it into the influence of said circuit and the current of said force-exerting means.

47. The combination with a member movable in response to changes in magnitude of a quantity, of a galvanometer, means whereby said galvanometer is controlled by said movable member, a movable structure, a source of power, a disengageable connection between said source of power and said movable structure, means controlled by said galvanometer and controlling said disengageable connection, a source of current, means responsive to changes in said current for exerting force upon said movable member, means for varying said current, a circuit, variable electrical means therein, means for shifting the connections of said galvanometer to bring it into the influence of said circuit and of said current of said force-exerting means, and means for alternately coupling said current-varying means and said variable electrical means to said movable structure.

48. The combination with a member movable in response to changes in magnitude of a quantity, of a galvanometer, means whereby said galvanometer is controlled by said movable member, a movable structure, a source of power, a disenageable connection between said source of power and said movable structure, means controlled by said galvanometer and controlling said disengageable connection, a source of current, means responsive to changes in said current for exerting a force upon said movable member, means for varying said current, a circuit, variable electrical means therein, means for coupling said current-varying means and said variable electrical means alternately to said movable structure, and means shifting the connections of said galvanometer to bring it into the influence of said circuit and the current of said force-exerting means simultaneously with coupling of said variable electrical means to said movable structure.

49. The combination with a casing, of a fluid connection thereto, a deflecting member in said casing, means causing deflection of said member in response to changes in flow of a fluid, a core moved by said deflecting member, a winding on the exterior of said casing co-acting with said core for varying the impedance of the circuit of said winding in response to changes of said flow, and electro-magnetic means for exerting a restoring force on said deflecting member comprising a member carried by said deflecting member, and a co-acting member on the exterior of said casing.

50. The combination with a movable member, of means moving said member in response to changes of pressure, a galvanometer, means causing deflection of said galvanometer in response to movement of said movable member, a movable structure, a source of power, a disengageable connection between said movable structure and said source of power, means controlled by said galvanometer and controlling said disengageable connection, and control means actuated by said movable structure.

51. The combination with a member, of means moving said member in response to changes of pressure, a galvanometer, means controlled by said movable member and controlling said galvanometer, a movable structure, a source of power, a disengageable connection between said movable structure and said source of power, means controlling said connection and controlled by said galvanometer, electro-magnetic means controlled by said movable structure for exerting a control force on said movable member, and control means actuated by said movable structure.

52. The combination with a member movable in response to changes in magnitude of a quantity, of a source of fluctuating current, a galvanometer associated therewith, reactive means controlled by said movable member for varying the deflection of said galvanometer in accordance with changes in magnitude of said quantity, a movable structure, means whereby said movable structure is displaced under control of said galvanometer extents corresponding with extents of change in magnitude of said quantity, and a circuit controlled by said movable structure.

53. The combination with a member movable in response to changes in magnitude of a quantity, of a source of fluctuating current, a galvanometer associated therewith, reactive means controlled by said movable member for varying the deflection of said galvanometer in accordance with changes in magnitude of said quantity, a movable structure, means whereby said movable structure is displaced under control of said galvanometer extents corresponding with extents of change in magnitude of said quantity, a circuit controlled by said movable structure, and means in said circuit for exerting a force on said movable member.

54. The combination with a member movable from its normal position in response to changes in magnitude of a quantity, of a source of fluctuating current, a galvanometer associated therewith, reactive means controlled by said movable member for varying the deflection of said galvanometer in accordance with changes in magnitude of said quantity, a movable structure, means whereby said movable structure is displaced under control of said galvanometer extents corresponding with extents of change in magnitude of said quantity, a circuit controlled by said movable structure, and means in said circuit for exerting on said movable member a force tending to return it to normal position.

55. The combination with a member movable in response to changes in magnitude of a quantity, of a source of fluctuating current, a galvanometer associated therewith, reactive means controlled by said movable member for varying the deflection of said galvanometer in accordance with changes in magnitude of said quantity, a movable structure, a source of power, a disengageable mechanical connection between said source of power and said movable structure, and means controlled by said galvanometer controlling said disengageable connection for effecting displacements of said movable structure whose extents correspond with the extents of change in magnitude of said quantity.

56. The combination with a member movable in response to changes in magnitude of a quantity, of a source of fluctuating current, a galvanometer associated therewith, reactive means controlled by said movable member for varying the deflection of said galvanometer in accordance with changes in magnitude of said quantity, a movable structure, a source of power, a disengageable mechanical connection between said source of power and said movable structure, means controlled by aid galvanometer controlling said disengageable connection for effecting displacements of said movable structure whose extents correspond with the extents of change in magnitude of said quantity, and control mechanism controlled by said movable structure.

57. Control apparatus comprising a deflecting member, means responsive to changes in rate of flow of a fluid for effecting movements of said deflecting member to extents corresponding with different rates of flow, a movable structure, a source of power, a disengageable mechanical connection between said source of power and said movable structure, means controlled by said deflecting member for effecting displacements of said movable structure to extents corresponding with different rates of flow, and a recorder controlled by said movable structure.

58. Control apparatus comprising a deflecting member, means responsive to changes in rate of flow of a fluid for effecting movements of said deflecting member to extents corresponding with different rates of flow, a movable structure, a source of power, a disengageable mechanical connection between said source of power and said movable structure, means controlled by said deflecting member for effecting displacements of said movable structure to extents corresponding with different rates of flow, and control means controlled by said movable structure.

59. The combination with means movable in response to changes in rate of flow of a fluid, of a circuit and a galvanometer therein, means whereby said galvanometer is controlled by said first-named means, a movable structure, and means whereby said movable structure is displaced under control of said galvanometer extents corresponding with extents of change in rate of flow of said fluid.

60. The combination with means movable in response to changes in rate of flow of a fluid, of a circuit and a galvanometer therein, means whereby said galvanometer is controlled by said first-named means, a movable structure, means whereby said movable structure is displaced under control of said galvanometer extents corresponding with extents of change in rate of flow of said fluid, and a recorder controlled by said movable structure.

61. The combination with a member deflecting in response to changes in magnitude of a quantity, of a circuit controlled thereby, means controlled by said member for varying the current in said circuit, a second deflecting member controlled by said current, and means controlled by said second deflecting member exerting a force on said first named deflecting member for effecting rebalance of said deflecting members.

62. The combination with a member deflecting in response to changes in magnitude of a quantity, of a circuit controlled thereby, means controlled by said member for varying the current in said circuit, a second deflecting member controlled by said current, means controlled by said second deflecting member exerting a force on said first named deflecting member for effecting rebalance of said deflecting members, a movable structure controlled by said second deflecting member, and a recorder controlled by said movable structure.

63. The combination with a member deflecting from its normal position in response to changes in magnitude of a quantity, of a circuit controlled thereby, means controlled by said member for varying the current in said circuit, a second deflecting member controlled by said current, a movable structure controlled by said second deflecting member, and means controlled by said movable structure for exerting on said first named deflecting member a force tending to move said first named deflecting member toward normal position.

64. The combination with a member deflecting in response to changes in magnitude of a quantity, of a circuit having a galvanometer therein and controlled by said member, means exerting a force on said deflecting member, and mechanism controlled by said galvanometer and controlling said force to correspond with said changes in magnitude of said quantity.

65. The combination with a member deflecting in response to changes in magnitude of a quantity, of a circuit having a galvanometer therein and controlled by said member, means exerting on said deflecting member a force opposing its deflection, and mechanism controlled by said galvanometer and controlling the magnitude of said force to accord with changes in magnitude of said quantity.

In testimony whereof I have hereunto affixed my signature this 3 day of May, 1920.

EARL A. KEELER.